United States Patent Office 2,834,740
Patented May 13, 1958

2,834,740

PLATINUM CATALYST AND PREPARATION THEREOF

Oliver Johnson, Berkeley, and Kenzie Nozaki, El Cerrito, Calif., assignors to Shell Development Company, New York, N. Y., a corporation of Delaware No Drawing. Application November 1, 1956
Serial No. 619,690

4 Claims. (Cl. 252—466)

This invention relates to supported platinum catalyst and a method for the preparation of such catalyst.

Platinum has long been used as a catalytic agent for a variety of conversions, for example hydrogenation, dehydrogenation, oxidation, isomerization, and dehydrocyclization of hydrocarbons. Since platinum is quite costly and is generally effective in quite small amounts, it is the practice to apply it on the surface of a suitable support or carrier material such as alumina, asbestos, activated carbon, or the like. The usual method in preparing such catalyst is to impregnate the support material with a solution containing the platinum and then dry and calcine the resulting composite. As suitable sources of the platinum solutions of chloroplatinic acid, ammonium platinum chloride, trimethylbenzyl ammonium platinum chloride, tetramino platino chloride, and ammonium platino nitrate have been suggested. Since chloroplatinic acid (or an ammoniacal solution of it) is the only commercially available water soluble platinum compound, it alone is used in preparing the commercial catalysts. Before use, the catalyst is usually calcined and frequently treated with hydrogen or another reducing gas under known conditions chosen to convert the platinum at least partially to the metallic state. In most cases, however, this reduction takes place automatically under the conditions of use of the catalyst.

The catalysts prepared in the described conventional manner are generally very active when fresh; in fact, they are often too active for some conversions and tend to promote excessive side reactions. However, even in these cases where the catalyst is not too active, it is usually observed that the catalyst loses activity at an appreciable rate and this results in many cases in a relatively short life of the catalyst. This falling off of the activity with use is noted particularly when the support material is alumina, i. e., consists of alumina or contains appreciable concentrations of alumina, and where the reactant material is not perfectly dry.

When preparing platinum catalysts by the conventional method, the air-dried catalyst contains appreciable amounts of other ions of the compound used. These ions, either due to their presence or to their action during their removal in subsequent calcination or use, are largely responsible for the loss of activity of the catalyst during use. Some of these ions are removed from the catalyst during calcination and others are not, being lost only slowly during use. Nitrate ions, for example, are converted to nitric acid and various oxides which act on the catalyst during calcination. Chloride ions tend to combine with the catalyst and are removed during use. In either case, the presence of these ions in the impregnated and dried catalyst adversely affects the life of the finished catalyst. Chloride ion, in particular, is found to exert a marked influence on the character of the catalyst; it tends greatly to cause the catalyst to promote degradation and isomerization reactions which produce tarry deposits. In some cases where such activity is desired, the chloride ion has a temporary beneficial effect. However, the chloride ion is only loosely bound in the catalyst, probably as oxychlorides, and is lost during use of the catalyst with the result that the catalyst shortly loses its desired activity.

An object of the invention is to provide supported platinum catalyst which before calcination as well as after calcination is substantially free of detrimental ions normally introduced with the platinum.

According to the present invention, supported platinum catalysts are prepared by impregnating a suitable support material with a specially prepared solution of a platinum complex which is free of harmful ions (anions). The special platinum complex solution used for impregnating the carrier may be prepared by dissolving chloroplatinic acid in water, reducing the compound to chloroplatinous acid, converting the acid to tetrammine platinous chloride, precipitating the chloride ion with silver oxide or hydroxide and filtering off the precipitated silver chloride. The resulting complex is tetrammine platinous hydroxide. When impregnating the carrier material with a solution of tetrammine platinous hydroxide there are no harmful anions in the solution or in the catalyst. When the carrier is an acidic carrier, such for instance as a silica-alumina cracking catalyst, the solution of tetrammine platinous hydroxide, which is quite strongly alkaline, reacts with the protons of the acid carrier to form water. Excess solution remaining after soaking the carrier may therefore be reused to make additional batches of catalyst by simply fortifying it with the required amount of the platinum complex. When using other platinum compounds, it is necessary to recover the platinum from the used solution.

A typical preparation is given in more detail in the following. A solution of 5 grams of chloroplatinic acid, $H_2PtCl_6 \cdot 6H_2O$, in 30 ml. of water and 1 ml. of concentrated hydrochloric acid in a 50 ml. Erlenmeyer flask is placed on a steam bath (85–90° C.) and stirred constantly during reduction to chloroplatinous acid with a freshly prepared solution of sulfur dioxide. The sulfur dioxide solution is added in increments of not more than 1 ml. at a time and sufficient time is allowed between additions for the sulfur dioxide odor to disappear. The solution becomes red as the reduction proceeds. The reduction to chloroplatinous acid is completed when a drop of the red solution added to three drops of a saturated solution of ammonium chloride gives only a trace of a precipitate after about one minute. Care should be taken that no excess of the reducing solution is added as this will cause formation of sulfito complexes.

After completing the reduction to the chloroplatinous acid ($H_2PtCl_4$), the solution is diluted to 700 ml. with water and divided into two portions. One portion is diluted to 100 ml. and heated to boiling. To this solution is added 125 ml. of a boiling solution of equal parts of water and concentrated ammonium hydroxide. The ammonium hydroxide solution should be added steadily at the boiling point with good stirring. The resulting yellow solution is then heated and stirred until it is completely colorless. This colorless solution is diluted to 175 ml. and the second portion of the chloroplatinous acid solution is added slowly with stirring. The green precipitate of $[Pt(NH_3)_4][PtCl_4]$ is filtered off and washed. To the moist precipitate is added 25 ml. of water and 100 ml. concentrated ammonium hydroxide. It is heated to boiling with vigorous stirring. It is kept at the boiling point until the precipitate all dissolves. This solution is finally heated until no ammonia odor is present. This solution now contains pure tetrammine platinous chloride. Further details regarding the preparation up to this point may be found in Fernelius: Inorganic Synthesis, vol. II, page 250, McGraw-Hill, 1946.

The solution of tetrammine platinous chloride is treated with the stoichiometric amount of freshly prepared silver oxide. This precipitates the chlorine as silver chloride and converts the tetrammine-platinous chloride to tetrammine platinous hydroxide, $Pt(NH_3)_4(OH)_2$. After filtering off the silver chloride, the solution is used to impregnate the catalyst carrier.

Any of the conventional support materials may be used. If the support material contains any appreciable concentration of chlorine, as chloride or otherwise, the chlorine should first be removed by a suitable treatment such as by thorough washing. Two distinct types of support materials should be recognized; namely, non-acidic and acidic. Non-acidic supports comprise pure silica gel, pure alumina, charcoal, coke, asbestos, and various materials in which natural acidity is neutralized by an added base, such as the oxides, hydroxides or carbonates of alkali metals. Such non-acidic type supports are preferably used when isomerization activity in the catalyst is not desired. Examples are in the hydrogenation of benzene, the dehydrogenation of methylcyclohexane, the dehydrocyclization of isooctane.

The acidic supports comprise alumina containing boric oxide, aluminum fluoride, aluminum phosphate, or silica properly combined; various combinations of silica with minor amounts of alumina, zirconia, titania, or magnesia. These combinations, along with the certain natural and treated clays are all cracking catalysts and are known as clay-type cracking catalysts. These acidic supports are chosen when it is desired that the catalysts also have isomerization activity. Examples are the isomerization of waxes, the dehydrogenation of methylcyclopentane to benzene, the reforming of gasoline fractions. The process of the invention is particularly advantageous for catalysts having an aluminous carrier of either the acidic or non-acidic type.

The impregnation may be carried out in any of the conventional ways. The carrier, either with or without previous evacuation, may be soaked in an excess of a dilute solution of the platinum complex, or in a more concentrated solution in an amount just sufficient to wet the carrier particles and be completely absorbed. Also, if desired, the solution may be incorporated into the carrier material during the formation of the latter.

The amount of platinum in the catalyst may vary in the conventional range. Normally and for most uses concentrations between about 0.1% and 1% are used.

After combining the platinum complex with the carrier, the composite is dried and then calcined, e. g. 300–600° C. If desired, the catalyst may also be reduced at the same time by supplying a stream of hydrogen.

The catalyst may be prepared in the form of granules, powder, or pellets, as desired. When preparing pellets, the powdered carrier may be pelleted before the impregnation, in which case the platinum is frequently more concentrated near the outside of the pellets than in the center. On the other hand, the powdered carrier may be impregnated prior to pelleting.

EXAMPLE 1

A solution of tetrammine platinous hydroxide containing 1.8 grams Pt per liter was prepared as described above. This solution was used to impregnate 16–42 mesh granules of gamma alumina. The alumina was a commercial grade (Harshaw 0501) which had been calcined at 700° C. to remove graphite binder and had an available surface of about 175 m.²/g. The amount of solution used was sufficient to just wet the particles and incorporate 0.16% platinum. The impregnated particles were then dried at 120° C. and then calcined at 500° C. for 2 hours.

The catalyst was used to dehydrogenate cyclohexene in a standardized test procedure. In this test the catalyst was heated to 500° C. in vacuum and then pure cyclohexene vapors were passed at a fixed rate and at 5 mm. pressure from a cold trap through a fixed bed of the catalyst at 500° C. to another cold trap. The amount of hydrogen liberated in a given time by the dehydrogenation was used as a measure of the dehydrogenation activity of the catalyst. On this basis the activity rating was 140.

A commercial halogen-containing platinum-alumina catalyst widely used in the reforming of gasoline fractions and containing approximately twice as much platinum, when crushed and screened to the same particle size and subjected to this same standard test, showed an activity rating of 5.

The catalyst was also used for the dehydrogenation of n-butane in a standardized test. In this test the catalyst in the form of 16–42 mesh granules was reduced by treating it at 500° C. for 2 hours in hydrogen and then vapors of n-butane were recycled through the catalyst bed at 500° C. until a fixed amount of gases (mainly hydrogen) was produced. The time required to produce this fixed amount of gas was used as a measure of the activity of the catalyst for this reaction. The product was in most cases separated by low temperature distillation and analyzed by infra red spectroscopic methods.

In this test the activity rating was 4 whereas that of the above-mentioned commercial catalyst was 0.67.

EXAMPLE 2

In this example, the base or carrier used was 16–42 mesh particles of a pure silica gel having an available surface of about 520 m.²/g. This material was impregnated with the same solution in the same manner to incorporate 0.16% platinum.

This catalyst was tested in the two above-described standard tests. Its rating for dehydrogenation of cyclohexene was 93 and for the dehydrogenation of n-butane was 0.5.

The catalyst was also tested for the conversion of methylcyclopentane in a standardized test. In this test, the catalyst in the form of 16–42 mesh granules is first heated under vacuum at 450° C. and then for 2 hours at 450° C. in hydrogen. Vapors of methylcyclopentane are then circulated through the bed of catalyst at a constant partial pressure of 150 mm. Hg until a definite gas production is achieved and the time required is taken as a measure of the activity of the catalyst. The product is analyzed by mass spectroscopy. The mole ratio of benzene to $C_6H_{10}$ hydrocarbons (essentially methylcyclopentene) in the product is a measure of the isomerization activity of the catalyst; a high ratio indicating high isomerization activity. In this test the rating was 1.33 for total activity and 0.27 for isomerization activity. The corresponding ratings for the above-mentioned commercial catalyst were 0.75 and 0.36 respectively. It is seen that this catalyst has a quite low isomerization activity. It therefore would be poorly suited for the reforming of gasoline but would be quite suited for use where isomerization is an undesired reaction as for instance in the dehydrogenation of methylcyclopentane to methylcyclopentene.

EXAMPLE 3

A commercial silica-alumina cracking catalyst containing about 14% $Al_2O_3$ was steamed at 812° C. until its available surface dropped to about 59 m.²/g. This material in the form of 16–42 mesh granules was impregnated in the same way with the same solution except that the amount used was sufficient to incorporate 0.20% platinum. When used in the described standard test with cyclohexene its rating was 6.5.

EXAMPLE 4

Portions of a pure silica gel were impregnated with aluminum nitrate to incorporate 0.1%, 0.5%, 1%, 4% and 8% $Al_2O_3$. The portions were calcined at 500° C.

for 2 hours to convert the nitrate to $Al_2O_3$. The first three portions were each impregnated as described above (Example 1) with the described platinum complex solution to incorporate 0.20% platinum. In the last two, the concentration of Pt was increased to 0.25%. The catalysts were tested in the described standard tests with the results given in the following table.

Table 1

| Percent $Al_2O_3$ | Cyclohexene Test | Methylcyclopentane Test | $C_6H_6/C_6H_{10}$ |
|---|---|---|---|
| 0.1 | 5 | 3.0 | 0.73 |
| 0.5 | 6 | 3.0 | 2.4 |
| 1.0 | 5 | 1.4 | 1.41 |
| 4.0 | 11.3 | (*) | (*) |
| 8.0 | 14.2 | (*) | (*) |

*Not tested.

The first three catalysts, although of about equal to the commercial catalyst mentioned above in dehydrogenation activity, have a considerably higher isomerization activity. The last two have considerably higher dehydrogenation activity.

EXAMPLE 5

A commercial pelleted gamma alumina (Harshaw 0501) was calcined at 700° C. to remove graphite. It was then impregnated with a dilute solution of HF to incorporate 1% F, dried and calcined at 500° C. for 2 hours. This material was impregnated as described above in Example 1 with the same platinum complex to incorporate 0.20% platinum. After drying and calcining as described, it was tested in the standard tests with the following results:

Cyclohexene test _____ 150
Methylcyclopentane test _____ 1.0
$C_6H_6/C_6H_{10}$ _____ 0.41

This catalyst exhibited a fairly good isomerization activity along with an exceptionally high dehydrogenation activity.

EXAMPLE 6

(A) A commercial silica gel stabilized with about 6% $SiO_2$ (Alorco H–40) was impregnated with 0.2% platinum in the same manner.

(B) A portion of the same silica gel was impregnated with a dilute solution of fluosilicic acid to incorporate 5% $H_2SiF_6$. After drying and calcining at 500° C. for 2 hours, this base was then impregnated with 0.2% platinum in the same manner.

(C) Another portion of the same silica gel was impregnated with a solution of aluminum borofluoride to incorporate 5% $Al(BF_4)_3$. After drying and calcining for 2 hours at 500° C. this base was also impregnated with the tetrammine platinous hydroxide solution in the same manner to incorporate 0.2% platinum.

(D) A fresh commercial silica-alumina cracking catalyst was calcined at 500° C. for 2 hours. This material having an available surface of about 450 m.²/g. was then impregnated with 0.2% platinum in the same manner.

The dehydrogenation activities of these catalysts as determined by the cyclohexene test were as shown in Table 2.

Table 2

Catalyst: Activity rating
A _____ 9
B _____ 14
C _____ 25.7
D _____ 37

EXAMPLE 7

Aluminum chloride was dissolved in aqueous hydrochloric acid, the latter in an amount to give a final pH of 3 after adding the sodium silicate. To this solution, a solution of sodium silicate was added. The resulting solution set to a gel at pH 3 and aged 10 days. The aged gel was washed with water, washed free of sodium with a solution of ammonium chloride, and was then dried and calcined. The resulting products contained 1.04% $Al_2O_3$.

Another preparation was made in the identical manner except that the concentration of $Al_2O_3$ was reduced to 0.86%.

These carriers were impregnated with 0.2% platinum in the manner described in Example 1. The activities of the catalysts were as shown in the following Table 3.

Table 3

| | 1.04% $Al_2O_3$ | 0.86% $Al_2O_3$ |
|---|---|---|
| Cyclohexene Test | 5 | 7 |
| Methylcyclopentane | 0.72 | 3.0 |
| $C_6H_6/C_6H_{10}$ | 2.7 | 1.3 |

Alumina incorporated with silica by the method described in this example is very efficiently combined and is exceedingly potent in imparting acidity. The great difference in isomerization activity between these catalysts which differ in a slightly different concentration of alumina illustrates the sensitivity of the balance.

As pointed out above, a certain amount or a large amount of isomerization activity is desired for some conversions and not for others. Where isomerization activity is desired it is obtained by applying the platinum to a carrier which exhibits a substantial cracking activity, i. e., an acidic cracking catalyst. Thus, for example, an acid treated clay catalyst such as those sold under the trade names "Filtrol" and "Filtrol SR" may be used or one of the various proprietory so-called synthetic cracking catalysts may be used.

In general, the highly active cracking catalyst may be used. In some cases cracking catalyst of this type modified to curtail somewhat their cracking activity may be desired in order to balance the different activities for different uses. For example, in the conversion of methylcyclopentane to benzene the isomerization of the methylcyclopentane to cyclohexane may proceed slower than the dehydrogenation of the resulting cyclohexane and may, therefore, be the rate controlling step in the conversion. In general, it is desired to bring the reaction rates close together and this is done by balancing the acidity of the support against the activity of the platinum.

The activity of the cracking catalyst used to support the platinum may be adjusted to any desired level within the known limits by incorporating known cracking promoters to increase the activity, or by limiting the activity. This latter may be accomplished by partially deactivating the base, by a steam treatment, or by heating, or both, or by modifying the composition away from the optimum for catalytic cracking. For example, alumina impregnated with boric oxide is a very active known cracking catalyst (see U. S. 2,407,918). The most active catalyst is produced when the $B_2O_3$ content is of the order of 10–15%. This catalyst may be prepared for the present purpose with any desired degree of activity up to the maximum by merely controlling the concentration of $B_2O_3$. The very active catalysts described in patents—U. S. 2,364,114, U. S. 2,415,716, U. S. 2,400,446, and U. S. 2,398,819 may likewise be adjusted to any desired activity in a like manner. In the case of the known synthetic composite cracking catalysts consisting essentially of silica with alumina, beryllia, zirconia, or magnesia the cracking activity is due to the presence of certain complex compounds possessing highly acid sites. The formation of these complex compounds in the catalyst depends both upon the presence of the necessary ingredients and upon the method of combining the ingredients. Thus, the activity of these catalysts may be controlled in the desired manner by either varying the method of preparation or by limiting the concentration of either of the ingredients. As an example of the latter, assuming a given method of preparation, the activity of a silica-alumina cracking catalyst may be controlled by combining only a limited amount of alumina (e. g., 0.05–2%) with silica, or combining only a limited amount of silica (e. g., 1.5%) with alumina (commercial silica-alumina cracking catalyst contains between about 14% and 28% $Al_2O_3$ for optimum cracking activity.)

This application is a continuation-in-part of application Serial No. 242,788, filed August 20, 1951, which is now abandoned.

We claim as our invention:

1. In the preparation of a supported platinum-containing catalyst comprising a major amount of a chloride-free carrier and a minor amount between 0.1 and 1% platinum the improvement which comprises impregnating the carrier with an aqueous solution of tetrammine platinous hydroxide, drying, and calcining to decompose said compound leaving the carrier impregnated with platinum.

2. Process according to claim 1 in which the carrier is an aluminous carrier.

3. Process according to claim 1 in which the carrier is non-acidic and the resulting catalyst is devoid of any appreciable isomerization activity.

4. Process according to claim 1 in which the carrier is an acidic cracking catalyst and the resulting catalyst possesses substantial activity for the isomerization of hydrocarbons.

References Cited in the file of this patent

UNITED STATES PATENTS

| | | |
|---|---|---|
| 2,623,860 | Haensel | Dec. 30, 1952 |
| 2,662,861 | Riblett et al. | Dec. 15, 1953 |
| 2,777,805 | Lefrancois et al. | Jan. 15, 1957 |